United States Patent
Gupta et al.

(10) Patent No.: US 9,258,706 B2
(45) Date of Patent: Feb. 9, 2016

(54) MOBILE DEVICE AND METHOD FOR SECURE ON-LINE SIGN-UP AND PROVISIONING FOR WI-FI HOTSPOTS USING SOAP-XML TECHNIQUES

(75) Inventors: Vivek Gupta, San Jose, CA (US); Necati Canpolat, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/993,296

(22) PCT Filed: Sep. 9, 2011

(86) PCT No.: PCT/US2011/051056
§ 371 (c)(1),
(2), (4) Date: Jun. 11, 2013

(87) PCT Pub. No.: WO2012/036992
PCT Pub. Date: Mar. 22, 2012

(65) Prior Publication Data
US 2013/0276076 A1  Oct. 17, 2013

(51) Int. Cl.
*H04W 12/06* (2009.01)
*H04N 19/426* (2014.01)
*H04N 19/43* (2014.01)

(52) U.S. Cl.
CPC .............. *H04W 12/06* (2013.01); *H04N 19/428* (2014.11); *H04N 19/43* (2014.11)

(58) Field of Classification Search
None
See application file for complete search history.

(56) References Cited

U.S. PATENT DOCUMENTS

| 7,735,091 | B2* | 6/2010 | Aaron | 719/315 |
| 7,826,833 | B2* | 11/2010 | Madhavan et al. | 455/418 |
| 8,223,717 | B2* | 7/2012 | Dillon et al. | 370/331 |
| 8,453,234 | B2* | 5/2013 | Dawson et al. | 726/22 |
| 8,582,471 | B2* | 11/2013 | Yun et al. | 370/254 |

(Continued)

FOREIGN PATENT DOCUMENTS

| CN | 103907310 A | 7/2014 |
| EP | 2676464 A1 | 12/2013 |

(Continued)

OTHER PUBLICATIONS

Chiornita et al, "A Practical Analysis of EAP Authentication Methods", 2010, 9th RoEduNet IEEE International Conference 2010, p. 31-35.*

(Continued)

*Primary Examiner* — Christopher Revak
(74) *Attorney, Agent, or Firm* — Schwegman Lundberg & Woessner, P.A.

(57) ABSTRACT

Embodiments of a mobile device and method for secure on-line sign-up and provisioning of credential for Wi-Fi hotspots using SOAP-XML techniques are generally described herein. Techniques for subscription remediation using SOAP-XML techniques are also generally described herein. In some embodiments, the mobile device may be configured to establish a transport-layer security (TLS) session with a sign-up server through a Wi-Fi Hotspot to receive a certificate of the sign-up server. When the certificate is validated, the mobile device may be configured to exchange device management messages with the sign-up server to sign-up for a Wi-Fi subscription and provisioning of credentials, and retrieve a subscription management object (MO) that includes a reference to the provisioned credentials for storage in a device management tree.

20 Claims, 8 Drawing Sheets

(56) References Cited

U.S. PATENT DOCUMENTS

| | | | |
|---|---|---|---|
| 8,590,023 B2 * | 11/2013 | Gupta et al. | 726/5 |
| 8,594,628 B1 * | 11/2013 | Schroeder et al. | 455/411 |
| 8,806,587 B2 * | 8/2014 | Frelechoux | 726/5 |
| 8,811,363 B2 * | 8/2014 | Velasco | 370/338 |
| 8,863,299 B2 * | 10/2014 | Sharma et al. | 726/26 |
| 8,935,654 B2 * | 1/2015 | Sengupta et al. | 717/101 |
| 9,015,815 B2 * | 4/2015 | Frelechoux | 726/5 |
| 9,084,081 B2 * | 7/2015 | Gupta et al. | |
| 2003/0163733 A1 * | 8/2003 | Barriga-Caceres et al. | 713/201 |
| 2006/0045267 A1 * | 3/2006 | Moore et al. | 380/247 |
| 2006/0173844 A1 | 8/2006 | Zhang et al. | |
| 2007/0180499 A1 | 8/2007 | Van Bemmel | |
| 2008/0127320 A1 | 5/2008 | De Lutiis et al. | |
| 2011/0265151 A1 * | 10/2011 | Furlan et al. | 726/4 |
| 2015/0180978 A1 * | 6/2015 | Canpolat et al. | 370/329 |

FOREIGN PATENT DOCUMENTS

| | | | |
|---|---|---|---|
| JP | 2003152718 A | | 5/2003 |
| JP | 2004304710 A | | 10/2004 |
| JP | 2005173805 A | | 6/2005 |
| JP | 2006277534 A | | 10/2006 |
| JP | 2006523412 A | | 10/2006 |
| JP | 2008042862 A | | 2/2008 |
| JP | 200897264 A | | 4/2008 |
| JP | 2009130545 A | | 6/2009 |
| JP | 2009545251 A | | 12/2009 |
| JP | 20118456 A | | 1/2011 |
| JP | 2011028522 A | | 2/2011 |
| WO | WO-2012036992 A2 | | 3/2012 |
| WO | WO-2012036992 A3 | | 3/2012 |

OTHER PUBLICATIONS

"International Application Serial No. PCT/US2011/051056, International Search Report mailed Mar. 5, 2012", 3 pgs.

"International Application Serial No. PCT/US2011/051056, International Preliminary Report on Patentability mailed Mar. 28, 2013", 6 pgs.

"International Application Serial No. PCT/US2011/051056, Written Opinion mailed Mar. 5, 2012", 4 pgs.

"European Application Serial No. 11825726.0, Extended European Search Report mailed Apr. 9, 2015", 10 pgs.

"Japanese Application Serial No. 2014-529658, Office Action mailed Mar. 3, 2015", w/ English Translation, 6 pgs.

"Korean Application Serial No. 2014-7009303, Voluntary Amendment filed Feb. 13, 2015", w/ English Claims, 56 pgs.

"WiMAX Forum Network Architecture Architecture, detailed Protocols and Procedures Over-The-Air Provisioning & Activation Protocol based on TR-069 Specification", Wimax Forum Wimax Forum, (Nov. 21, 2009), 73 pp.

"Wimax Forum Network Architecture—Architecture, detailed Protocols and Procedures—WIMAX Over-the-Air General Provisioning System Specification", Wimax Forum, [Online]. Retrieved from the Internet: <URL:http://resources.wimaxforum.org/sites/wimaxforum.org/files/technical_document/2011/01/WMF-T33-103-R015v02_OTA-General.pdf>, (Nov. 22, 2009), 32 pgs.

Husain, S, et al., "Remote device management of WiMAX devices in multi-mode multi-access environment Abstract", Broadband Multimedia Systems and Broadcasting, IEEE International Symposium On, IEEE, Piscataway, NJ (Mar. 31, 2008), 2 pgs.

* cited by examiner

MOBILE DEVICE AND METHOD FOR SECURE ON-LINE SIGN-UP AND PROVISIONING FOR WI-FI HOTSPOTS USING SOAP-XML TECHNIQUES

CROSS-REFERENCE TO RELATED APPLICATION

This application is a U.S. National Stage Filing under 35 U.S.C. 371 from International Application No. PCT/US2011/051056, filed on Sep. 9, 2011, and published in English as WO 2012/036992 on Mar. 22, 2012 which is incorporated herein by reference in its entirety.

RELATED APPLICATION

This application is related to U.S. patent application Ser. No. 13/173,338, entitled "MOBILE DEVICE AND METHOD FOR AUTOMATIC CONNECTIVITY, DATA OFFLOADING AND ROAMING BETWEEN NETWORKS," filed Jun. 30, 2011, which is incorporated herein by reference in its entirety.

This application is also related to U.S. patent application Ser. No. 13/188,205, entitled "SECURE ON-LINE SIGN-UP AND PROVISIONING FOR WI-FI HOTSPOTS USING A DEVICE-MANAGEMENT PROTOCOL," filed Jul. 21, 2011, which is incorporated herein by reference in its entirety.

TECHNICAL FIELD

Embodiments pertain to wireless fidelity (Wi-Fi) networks. Some embodiments pertain to secure on-line sign-up and provisioning of credentials for service and connectivity. Some embodiments relate to secure on-line sign-up and provisioning using Simple Object Access Protocol (SOAP) extensible-markup language (XML) techniques. Some embodiments relate to Hotspot 2.0 networks and the Hotspot 2.0 evolution.

BACKGROUND

One issue with subscription establishment with a service provider for Wi-Fi network access is that it is not a simple and user-friendly process. There is no standardized process for secure on-line sign-up and provisioning of credentials for Wi-Fi enabled devices and networks. Users generally may have to confront web pages of different types, enter information and select their usernames/passwords at different locations.

Another issue with subscription establishment is security. Open networks may not provide sufficient security while secure networks (such as those that are 802.1x enabled) may prohibit access to non-registrants. Current online sign-up mechanisms expose users to unacceptable security risks such as getting their credit card and personal information stolen (e.g., thru well-known honey-pot, or twin-evil security holes).

Another issue with subscription establishment is the different types of credentials that may need to be provisioned. Some devices or networks may require certificate-based credentials while some other devices or networks may use username/password credentials. Other devices or networks may use subscriber-information module (SIM) type credentials (e.g., generally used for some cellular networks).

Thus, there are general needs for secure on-line sign-up and provisioning of credentials. There are also general needs for secure on-line sign-up and provisioning of credentials securely using on-line sign systems that use SOAP-XML techniques as a transport. There are also general needs for a standardized process for secure on-line sign-up that is suitable for provisioning different types of credentials such as username/password credentials, SIM type credentials and certificate-based credentials. There are also general needs for a standardized process for secure on-line sign-up and provisioning of credentials that is suitable for use in any 802.11 based network including both open and secure networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments of the present invention provide for secure online signup and provisioning of credentials for Wi-Fi hotspot service so that users can establish a subscription with a Wi-Fi service provider and download credentials and policy components onto the client device in a secure manner using SOAP-XML techniques. This allows operators (e.g., Wi-Fi service providers) to develop an online signup mechanism at a much lower cost using standardized tools. Embodiments are applicable to both legacy Wi-Fi networks and evolving Hotspot 2.0 networks. Embodiments of the present invention also provide for subscription remediation for updating credentials for Wi-Fi hotspot service using SOAP-XML techniques.

Figure 1:
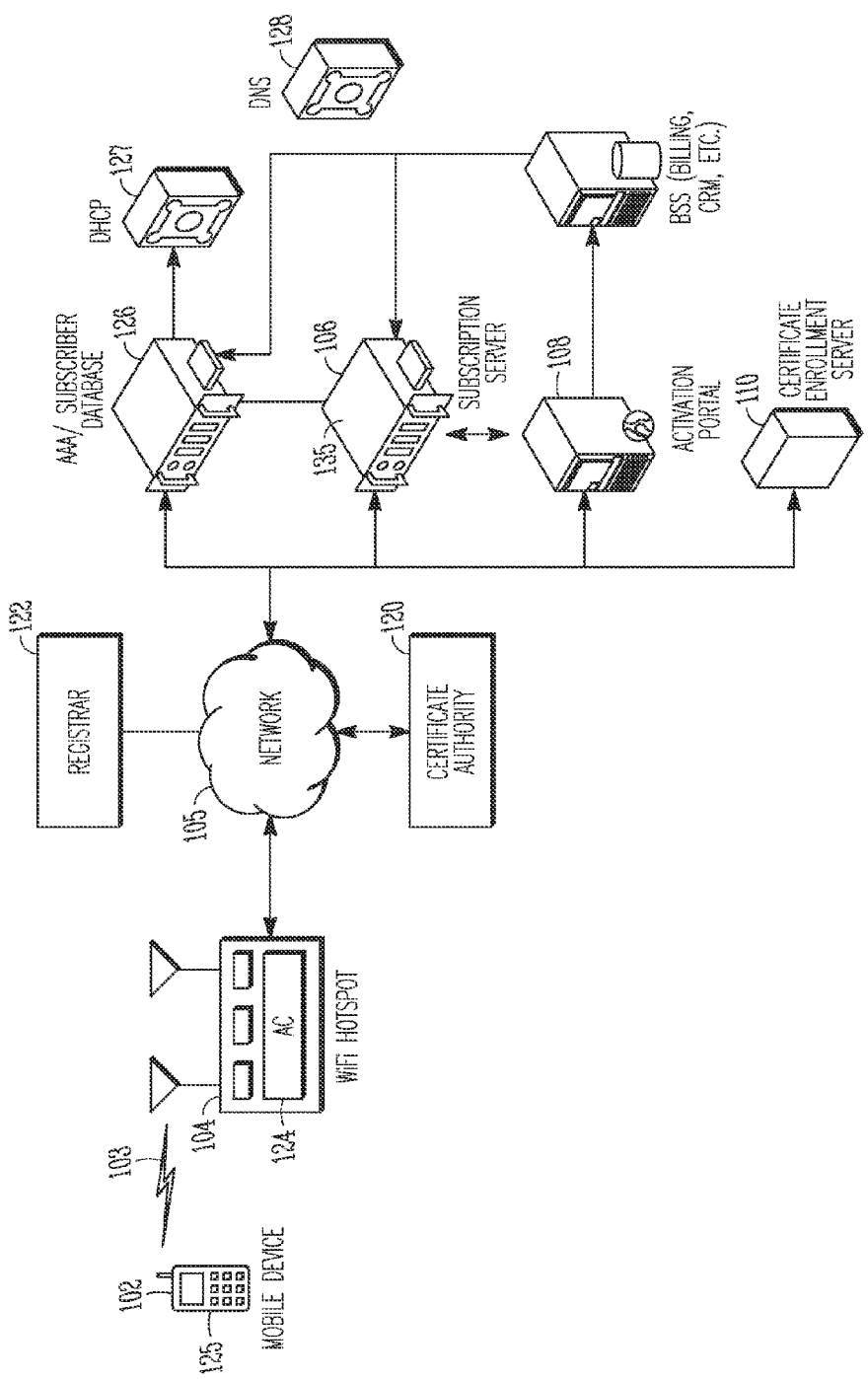
FIG. 1 illustrates an operational environment of network elements for secure on-line sign-up and provisioning of credentials in accordance with some embodiments.

FIG. 1 illustrates an operational environment of network elements for secure on-line sign-up and provisioning of credentials in accordance with some embodiments. Mobile device 102 may be a Wi-Fi enabled device that is configured to associate with a Wi-Fi hotspot 104 and perform the various operations described herein for secure on-line sign-up and provisioning. The Wi-Fi hotspot 104 may provide Internet access over a wireless local area network (WLAN) with a router connected to a link to an Internet service provider. The Wi-Fi hotspot 104 may be part of a Wi-Fi network and may be coupled to a network 105, such as the Internet or through a gateway to other various network elements including a certificate authority 120, a subscription server 106, an activation portal 108, a certificate enrollment server 110, and a registrar 122 among others. In some embodiments, the subscription server 106 may be a server configured to exchange messages in accordance with SOAP-XML techniques. The Wi-Fi hotspot 104 may operate as a Wi-Fi access point (AP). The mobile device 102 may include a SOAP processing element 125 configured to implement SOAP-XML techniques and perform various operation described herein. Similarly, the subscription server 106 may include a SOAP processing element 135 configured to implement SOAP-XML techniques as described in more detail below.

In some embodiments, the Wi-Fi hotspot 104 may include an access controller (AC) 124 to serve as a management entity for the Wi-Fi hotspot 104. The access controller 124 may manage several access points of the Wi-Fi network and may operate as a gateway for a WLAN access network to provide access to other networks such as the Internet. The access controller 124 may perform various operations described here to allow mobile devices access to a Wi-Fi network.

In accordance with embodiments, the mobile device 102 may be configured for secure on-line sign-up and provisioning of credentials for Wi-Fi hotspots. In some embodiments, the mobile device 102 may be configured for secure on-line sign-up and provisioning for Wi-Fi hotspots using SOAP-XML techniques. In these embodiments, the mobile device 102 and the subscription server 106 may exchange request and response messages that are configured in accordance with a Simple Object Access Protocol (SOAP).

In some embodiments, the secure on-line sign-up and provisioning process described herein allows users to establish a subscription with a service provider and download credentials and operator policy onto a client device, such as the mobile device 102, in a secure manner using SOAP-XML techniques as a transport. This may allow cellular-type network service providers that may already be implementing SOAP-XML techniques in their backend core networks to use the same servers and installed components to extend that functionality for servicing Wi-Fi networks.

Some embodiments provide a standardized process for secure on-line sign-up and provisioning credentials including username/password credentials, certificate-based credentials and SIM-type credentials. The standardized process for secure on-line sign-up and provisioning credentials may be applicable to almost any IEEE 802.11-based network making the process applicable to both open and secure networks. A secure Wi-Fi network, for example, may implement security in accordance with a robust-security network (RSN) protocol. Such a network may be considered an RSN network (i.e., a security network that allows the creation of robust security network associations (RSNAs)).

Accordingly, users may no longer have to confront web pages of different types and enter information and select their usernames/passwords at different locations. Wi-Fi networks may now be easier to use and are more secure. The use of SOAP-XML techniques allow Wi-Fi network operations to be easily integrated with current and future cellular-type networks. In some embodiments, secure on-line sign-up and provisioning of credentials may be performed automatically and without user interaction.

In accordance with embodiments, the mobile device 102 may be configured for secure on-line sign-up and provisioning for Wi-Fi Hotspot 2.0 networks. In these embodiments, the mobile device 102 may be configured to authenticate with a Wi-Fi network through the Wi-Fi Hotspot 104 using an Extensible Authentication Protocol (EAP) technique. As part of the authentication, a RADIUS ACCESS-ACCEPT message is received by the Wi-Fi hotspot 104 from the AAA server 126 to allow the mobile device 102 access to the Wi-Fi network and establish a Wi-Fi connection with the mobile device 102. The mobile device 102 may perform an initial SOAP exchange with the subscription server 106 over the established Wi-Fi connection to request provisioning of credentials or request subscription remediation, the initial SOAP exchange including the mobile device authenticating the subscription server 106. The mobile device may also exchange information with the subscription server 106 to establish a subscription with a service provider for Wi-Fi network access, to provision credentials for the subscription, and to create a subscription management object MO for the provisioned credentials. The mobile device may also perform a final SOAP exchange with the subscription server 106 over the Wi-Fi network to receive the subscription MO.

In these embodiments, in response to receipt of the RADIUS ACCESS-ACCEPT message, the Wi-Fi Hotspot 104 is configured to send an EAP-Success message to the mobile device 102 indicating a successful authentication. In some embodiments, the association with the Wi-Fi hotspot 104, the initial and final SOAP exchanges as well as authentication of the subscription server 106 may be performed without user input (i.e., automatically). In some embodiments, the exchange of information with the subscription server 106 for subscription establishment may also be performed without user input depending on the information needed. In some embodiments, the method may include prompting the user for user input and providing the user input to the subscription server 106.

In some embodiments, the initial SOAP exchange may include providing at least some device capability information of the mobile device 102 and indicating a reason for the request (e.g., provisioning of credentials or remediation of a subscription). When the reason for the request is provisioning of credentials, the subscription server 106 may indicate the type of credentials to be provisioned.

In some embodiments, the initial and final SOAP exchanges comprise messages configured in accordance with a SOAP technique using secure Hypertext Transfer Protocol HTTPS as an application layer protocol for transport. The messages may be configured in accordance with an extensible-markup language XML message format. The HTTPS may include a combination of HTTP with SSL/TLS protocol to provide secure and encrypted communications.

In some embodiments, the RADIUS ACCESS-ACCEPT message may include access restrictions to be enforced by the Wi-Fi Hotspot 104. The access restrictions to limit access of the mobile device 102 to the Wi-Fi network for either provisioning of credentials or subscription remediation. The Wi-Fi Hotspot 104 may be configured to enforce the access restrictions by limiting the mobile device 102 to performance of the initial and final SOAP exchanges and the exchange of information with the service provider for either provisioning of credentials or subscription remediation.

After receiving the subscription MO, the mobile device may be configured to disassociating with the Wi-Fi Hotspot 104 after the final SOAP exchange, and re-associating with the Wi-Fi Hotspot 104 to re-establish a Wi-Fi connection. When re-associating, the mobile device 102 may be configured to use an EAP technique and may provide the provisioned credentials to the AAA server 126 over the re-established Wi-Fi connection. A RADIUS ACCESS-ACCEPT message may be received at the Wi-Fi Hotspot 104 from the AAA server 126 to grant the mobile device 102 access to the Wi-Fi network in accordance with the user's subscription. In some embodiments, the disassociating and re-associating may be performed without any user interaction. The Wi-Fi Hotspot 104 is configured to implement access restrictions indicated in the RADIUS ACCESS-ACCEPT message that are associated with the user's subscription.

In some embodiments, as part of the initial SOAP exchange with the subscription server 106, the subscription server 106 may be configured to determine the type of credentials to be provisioned and to indicate the type of credentials to be provisioned to the mobile device 102. The type of credentials to be provisioned includes one or certificate-based credentials, username/password credentials, or subscriber-information module SIM type credentials. The provisioning of credentials may include exchanging SOAP configured messages as described in more detail below. The type of credentials to be provisioned may be determined by the operator or service provider. Operator policy may be used determine the type of credentials to provision and use for authentication.

When subscription mediation is needed (i.e., there is a problem with the user's subscription), the method includes the mobile device receiving an action message indicating a need for subscription remediation after associating with the Wi-Fi Hotspot 104 and subsequent authentication request. During the initial SOAP exchange, the mobile device is configured to request subscription remediation with a subscription mediation server 506 and to exchange information in accordance with a SOAP technique. In some embodiments, the subscription mediation server may be the same server as the subscription server 106, although this is not a requirement.

In accordance with embodiments, the mobile device 102 may be configured with registrar information, such as the URL of the registrar 122. The registrar 122 may contain service provider entries, which may include the service provider fully qualified domain name (FQDN), the service provider friendly name, and the service provider on-line sign-up root trust. The registrar 122 may provide cryptographic binding between the service-provider domain name and other data. The registrar 122 may be used by the mobile device 102 to establish a trust relationship between the mobile device 102 and an online sign-up server, such as subscription server 106. When the mobile device 102 initiates on-line sign-up, it may query the registrar 122 for metadata of the on-line sign-up server and may verify the authenticity of the on-line sign-up service provider. The mobile device 102 may also download the registry information in advance and may store it locally and use it when it initiates the secure on-line sign-up and provisioning process described herein. If the mobile device 102 is a dual-mode mobile device (e.g., having both cellular network capability and Wi-Fi network capability), the mobile device 102 may also be configured to query the registrar 122 in real-time using a cellular-network connection to retrieve on-line sign-up server information and to verify authenticity.

In accordance with embodiments, the mobile device 102 may be configured to associate with a Wi-Fi hotspot 104 of a Wi-Fi network and establish a transport-layer security (TLS) session with the subscription server 106 through the Wi-Fi hotspot 104 to receive a digital certificate of the subscription server 106. In accordance with embodiments, the mobile device 102 may exchange information over the established secure HTTP connection with the activation portal 108 to provision a subscription for Wi-Fi network access and create a subscription management object (MO). The subscription MO may include a reference to the type of credentials (e.g., username/password, SIM-type or certificate-based) that have been provisioned for automatic connectivity to certain Wi-Fi networks including Hotspot 2.0 networks.

In the case of username/password credentials, the subscription MO may include a username and password. In the case of SIM-type credentials, the subscription MO may include at least some basic information about the SIM-type credentials. In the case of certificate-based credentials, the subscription MO may include information for accessing certificate-based credentials. These embodiments are described in more detail below.

Although many embodiments are described herein for secure on-line sign-up and provisioning for Wi-Fi Hotspot 2.0 networks, the scope of the invention is not limited in this respect. Other embodiments are applicable to secure on-line sign-up and provisioning for other types of networks including other wireless local-area networks (WLANs) and cellular-type networks.

In accordance with some embodiments, the certificate authority 120 may be a Hotspot 2.0 Certificate Authority (CA) (i.e., the Root Trust) and may be configured to issue certificates including Hotspot 2.0 certificates. The registrar 122 may be where a company or organization that is registered as a Hotspot 2.0 service provider. The registrar 122 may include an already registered FQDN and/or a chosen friendly name. The FQDN owner may be identified in a publicly available "WHOIS" database. The chosen friendly name should not be similar or confused with already registered friendly names. The registrar 122 may invoke rules for registration that may allow the rejection of a requested friendly name, if not appropriate. The registrar 122 may maintain the database of registered service providers along with their friendly names and remove invalid entries. A Hotspot 2.0 certificate from the certificate authority 120 may only be issued to a registered entity (i.e., registered with the registrar database). The certificate may have a lifetime that does not exceed the FQDN registration lifetime. In some cases, the registrar 122 may also act as a certificate authority.

In accordance with embodiments, the mobile device 102 may obtain one or more Hotspot 2.0 root certificate(s) from the certificate authority 120 and the root certificate may identify the server's FQDN and indicate that it is usable for HTTPS based authentication for on-line sign-up and provisioning of credentials. The Hotspot 2.0 service provider may provision the on-line subscription server 106 with certificates from the certificate authority 120 and may provision appropriate policy settings on the on-line subscription server 106. These embodiments are discussed in more detail below.

A service provider's network may also include an authentication, authorization, and accounting (AAA) server 126 that includes, among other things, a subscriber database. The AAA server 126 may communicate with network elements such as a Dynamic Host Configuration Protocol (DHCP) server 127 for dynamic allocation of IP addresses and Domain Name Server (DNS) 128 for domain-name translation, as well as performing other networking operations.

In some embodiments, the Wi-Fi hotspot 104 may be a Wi-Fi Hotspot 2.0 operating in accordance with a Hotspot 2.0 evolution specification, such as the Hotspot 2.0 evolution specification of the Wi-Fi Alliance. The mobile device 102 may be a Hotspot 2.0 enabled device and the subscription information may include pre-provisioned subscription information for automatic connection to a Wi-Fi Hotspot 2.0. A Wi-Fi network may be a wireless network including a Wi-Fi hotspot configured to operate in accordance with one of the IEEE 802.11 standards (and amendments thereto) for WLANs.

A Wi-Fi network may use a carrier-sense multiple access technique with collision avoidance (CSMA/CA) in which upstream and downstream communications use the same frequency channels in accordance with a time-division multiplexed process. Some Wi-Fi networks may use orthogonal frequency division multiplexing (OFDM). Cellular networks, on the other hand, such as fourth-generation (4G) LTE networks and WiMAX networks, implement an orthogonal-frequency division multiple access (OFDMA) technique. Third-generation (3G) cellular networks may use a code-division multiple access (CDMA) technique. In some embodiments, the mobile device 102 may be a dual-mode device having physical-layer circuitry configured for communicating with both Wi-Fi and cellular networks.

Figure 2:
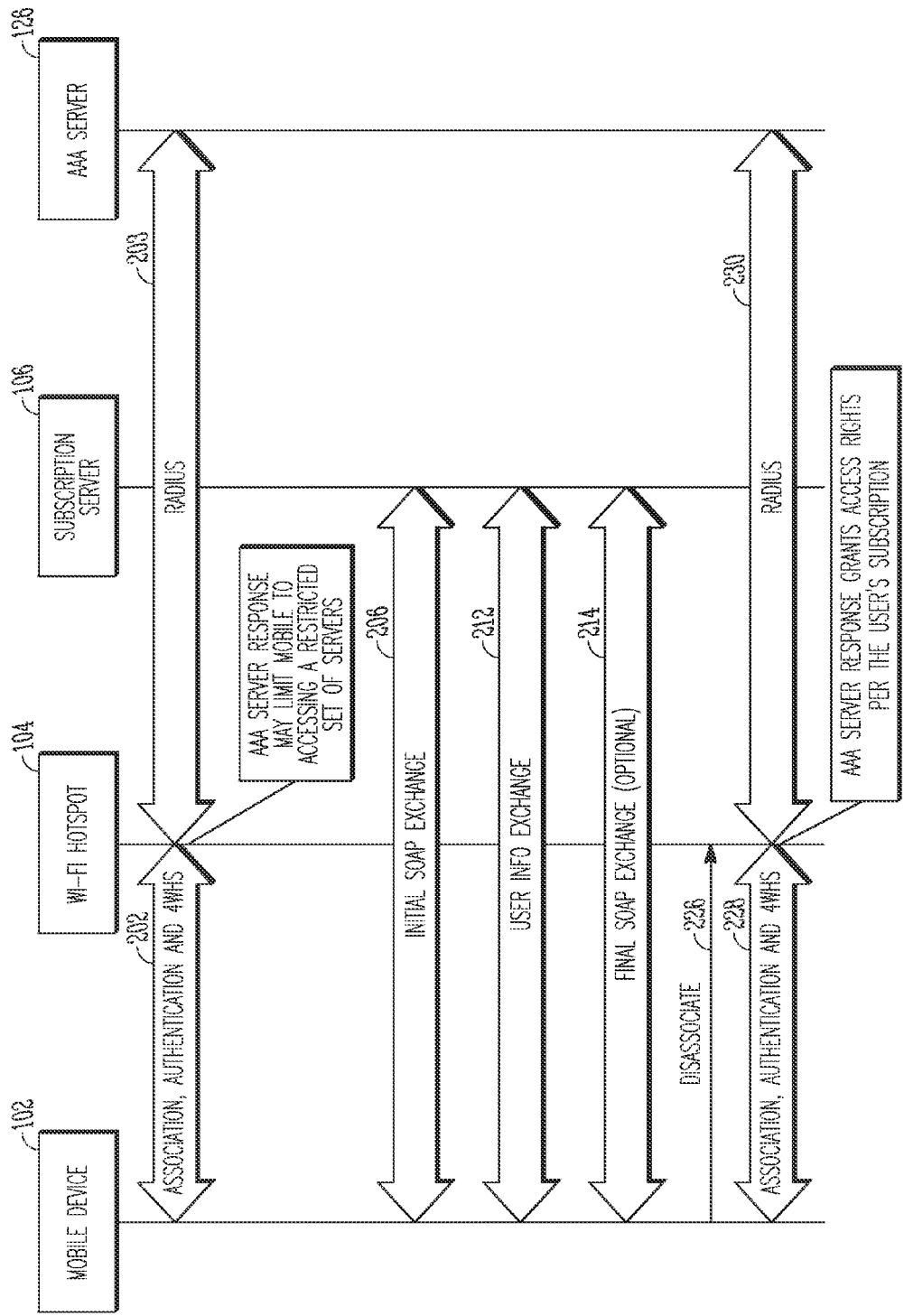
FIG. 2 is an overview for secure on-line sign-up and provisioning of credentials using SOAP-XML techniques in accordance with some embodiments.

FIG. 2 is an overview for secure on-line sign-up and provisioning of credentials using SOAP-XML in accordance with some embodiments. In these embodiments, server side authentication is used to authenticate the network components. Thereafter the Wi-Fi network redirects the mobile device 102 to the subscription server 106 to establish the subscription and create credentials or to a subscription remediation server for subscription remediation.

In operation 202, the mobile device 102 initiates the credential provisioning process by associating with the Wi-Fi network using an EAP method. A successful EAP exchange culminates in an RADIUS ACCESS-ACCEPT message 203 delivered to the Wi-Fi hotspot 104. The RADIUS ACCESS-ACCEPT message 203 may include or indicate access restrictions for the Wi-Fi hotspot 104 to enforce on its behalf. The use of access restrictions during the credential provisioning process may help protect the network and prevent a user from obtaining internet access. In some embodiments, a RADIUS authentication protocol may be performed as part of operation 202. In some embodiments, the RADIUS ACCESS-ACCEPT message 203 may include instructions to cause the Wi-Fi hotspot 104 to limit access of the mobile device 102 to a restricted set of servers.

In operation 206, an initial SOAP exchange is performed by the mobile device 102 authenticate the subscription server 106, to provide at least some device capability information to the subscription server 106, and to inform the subscription server 106 whether provisioning of credentials is requested or whether subscription remediation is requested. When the mobile device 102 already has credentials, as is the case for subscription remediation, the subscription server 106 may automatically authenticate the mobile. Upon receipt of this information, the subscription server 106 may determine whether user input is needed or whether machine-only exchange messages are needed. If user input is needed, the subscription server 106 may inform the mobile device 102 to launch a browser. If machine-only messages are needed, the response from the subscription server 106 may contain an indication that the message flow is complete or that additional machine exchanges are needed. In these embodiments, messages in this flow may carry an HTTP content type of "application/soap+xml". The messages may be delivered to the SOAP processing application in both the mobile device 102 (e.g., SOAP processing element 125) and the SOAP processing application in the subscription server 106 (e.g., SOAP processing element 135).

Operation 212 is performed when user input needed (e.g., to sign-up for service or to pay a bill). In operation 212, the mobile device 102 may launch browser and the user may be prompted for information via webpages. At the end of the user exchange, the message flow may be completed or further messages may be required; in either case, the subscription server 106 may inform the mobile device 102 the message exchange is complete or alternatively identify the next step in the process. In these embodiments, messages in this flow carry HTTP content types used for webpages. This includes, but is not limited to "text/html", "application/xml" and "application/xhtml+xml" content types.

In operation 214, a final SOAP exchange may complete the credential provisioning process. This final SOAP exchange may comprise machine-to-machine communication (i.e., no user input needed). This final SOAP exchange may be used when provisioning certificates. In these embodiments, messages in this flow carry an HTTP content type of "application/soap+xml". These messages may be delivered to the SOAP processing applications of both the mobile device 102 and the subscription server 106.

In operation 226, the mobile device 102 may disassociate from the Wi-Fi network since credentials may have been provisioned. In operation 338, the mobile device 102 may associate and authenticate a subsequent time to the Wi-Fi network. The Wi-Fi Hotspot 104 may relay EAP messages to and from the AAA server 126. At the end of a successful EAP exchange culminating in an Access-Accept RADIUS message 230, the AAA server 126 may deliver any access restrictions to the Wi-Fi Hotspot 104, if applicable, according to the user's subscription. Any access restrictions that were instantiated for credential provisioning or subscription remediation are thereby removed.

Figure 3A:
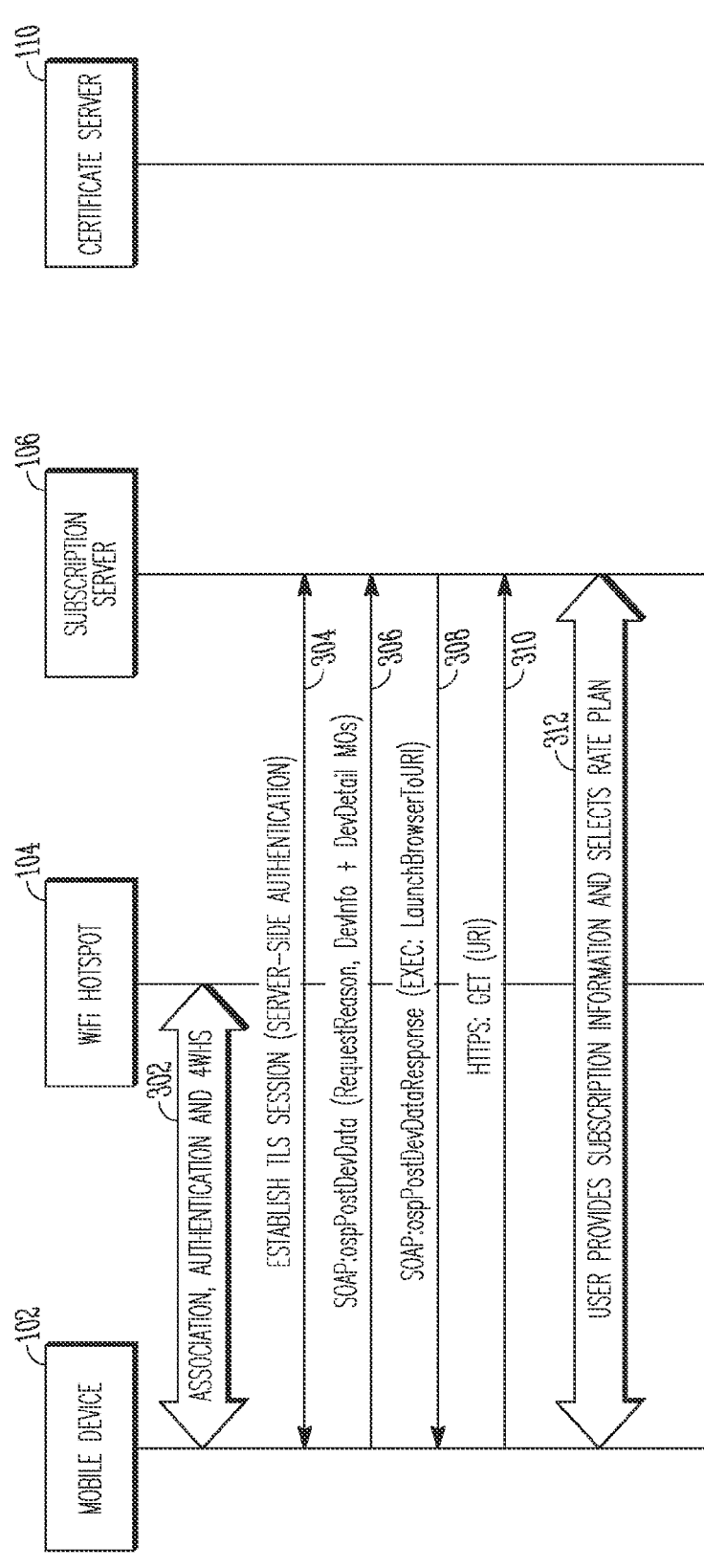
FIGS. 3A and 3B illustrate messages exchanged for secure on-line sign-up and provisioning of certificate-based credentials using SOAP-XML techniques in accordance with some embodiments.
Figure 3B:
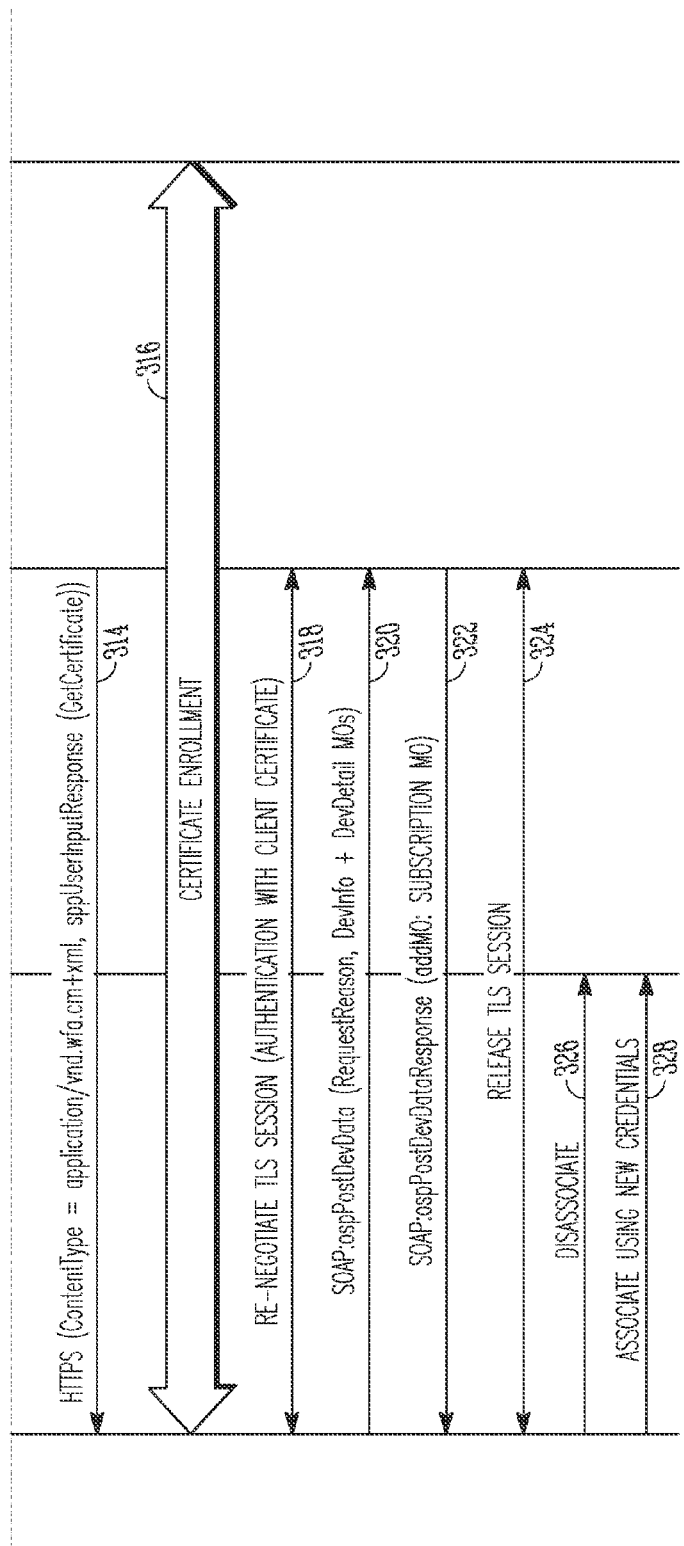

FIGS. 3A and 3B illustrate messages exchanged for secure on-line sign-up and provisioning of certificate-based credentials using SOAP-XML techniques in accordance with some embodiments. In operation 302, the mobile device 102 may associate with a Wi-Fi hotspot 104. In some embodiments, the mobile device 102 may initially scan for Hotspot 2.0 enabled networks and may also look for indications in the beacon of a Wi-Fi hotspot to determine if the Wi-Fi network is secure (e.g., RSN-enabled and whether it has support for Hotspot 2.0 connectivity). The mobile device 102 may select the most appropriate network based on user preferences. If the mobile device 102 determines that it does not have a subscription with the selected service provider, it may be configured to automatically engage in on-line sign-up and provisioning (i.e., without user intervention) as discussed in more detail below.

For RSN enabled networks, the mobile device 102 may be configured to access the RSN-enabled network without credentials. In these embodiments, the mobile device 102 may be configured to send a generic server access (GAS) request (such as an IEEE 802.11u based GAS request) to request an on-line sign-up Network Access Identifier (NAI). The on-line sign-up NAI may be received from the network using the GAS query. After receiving the NAI, the mobile device 102 may use the NAI in an Extensible Authentication Protocol (EAP) authentication process to indicate to the network that it intends to sign-up for service and create credentials for provisioning. The network may be configured to allow access to the mobile device 102 for this purpose without requiring user authentication. The mobile device 102 may then perform server-side authentication as discussed in more detail below.

In some embodiments, operation 302 may include performing a four-way handshake (4WHS) to allow the mobile device 102 and the authenticator to derive session keys from a master key generated after the EAP authentication process. The 4WHS may be in accordance with IEEE 802.11i, although this is not a requirement. In operation 302, the mobile device 102 may be configured to establish a TLS session with a subscription server 106 through the Wi-Fi hotspot 104 to receive the certificate of the subscription server 106. The certificate may be a Hotspot 2.0 certificate that may be issued by a Hotspot 2.0 certificate authority (i.e., a Root Trust) and may be referred to as a root certificate.

In some embodiments, the mobile device 102 may establish the TLS session in operation 304 with the subscription server 106 in accordance with the procedures of RFC 2560 and may perform server-side authentication using HTTPS. In some embodiments, after establishing the TLS session with the subscription server 106, the mobile device 102 may verify that the certificate of the subscription server 106 has been signed by a Hotspot 2.0 trust root. When the mobile device 102 verifies or is able to verify that the certificate of the subscription server 106 has been signed by the Hotspot 2.0 root trust, the mobile device 102 may be configured to perform operation 306 to initiate new subscription establishment.

Embodiments disclosed herein are applicable to both open networks as well as a secure 802.1x type of a network since a TLS session is established for credentials provisioning. Thus, the same process described below may be used for both open/unsecure Wi-Fi networks and secure Wi-Fi networks (e.g., with 802.1x security).

In some embodiments, to verify that the certificate of the subscription server 106 has been signed by a Hotspot 2.0 root trust, the mobile device 102 may use a public key of the Hotspot 2.0 root trust to verify the certificate. The public key may be obtained from a key server or from a storage element within the mobile device 102. When the mobile device 102 is unable to verify that the sign-up server's certificate has been signed by a Hotspot 2.0 root trust, or when the sign-up server's certificate has not been signed by a Hotspot 2.0 root trust, the mobile device 102 may abort the on-line sign-up and provisioning process and release/end the established TLS session.

In operation 306, the mobile device 102 may transmit an online signup protocol (osp) post-device data (ospPostDev-Data) message in accordance with a SOAP technique to the subscription server 106. The message may include a request reason (requestReason) value as well as device information (DevInfo) and device detail (DevDetail). In some embodiments, the device information and device detail information may be OMA-DM DevInfo and OMA-DM DevDetail MOs, such as those disclosed in patent application Ser. No. 13/188, 205. The mobile device 102 may set the value for the request reason in the message to "subscription registration" indicating that the mobile device 102 wishes to register for credentials.

For subscription remediation, the mobile device 102 may set the value for the request reason in the message to "subscription remediation" indicating that the mobile device 102 wishes to perform subscription remediation. These embodiments are discussed in more detail below (see FIG. 5).

In operation 308, the subscription server 106 may use the information provided in the DevInfo and DevDetail MOs to determine the type of credentials to provision (i.e., user/password credentials or certificate based credentials). In the embodiments described in FIG. 3, certificate-based credentials are to be provisioned. In operation 308, the subscription server 106 may transmit an ospPostDevDataResponse message in accordance with a SOAP technique to the mobile device 102. Since the mobile device 102 has requested subscription registration, the subscription server 106 may returns a command for the mobile device to launch a browser to the URI supplied in the message.

In operation 310, upon receiving the Execute:Launch-BrowsertoURI command from the subscription server 106, the mobile device 102 may launch the browser, establish a secure HTTPS connection to the URI returned in operation 308, and may send an HTTPS GET request to the online server URI returned in operation 308.

In operation 312, the mobile device 102 and the subscription server 106 may exchange any required user information requested by the service provider for subscription creation. This exchange may involve providing information about the user, selecting appropriate subscription plans, providing any credit-card information or payment information, and establishing policy and other parameters.

After the exchange of registration data in operation 312, operation 314 is performed in which the mobile device 102 may retrieve from the subscription server 106 an ospUserInputResponse XML instance document. If no error occurred, the ospUserInputResponse is a container for ospStatus and the getCertificate exec command. The web browser may pass the XML instance document to the locally registered helper application for processing (e.g., a connection manager). The XML instance document may contain the URI of the certificate enrollment server 110 as well as other metadata needed for certificate enrollment.

Operation 316 is performed when certificate based credentials are to be provisioned. The certificate enrollment procedure of operation 316 may be performed in accordance with a certificate-enrollment protocol (e.g., certificate-management protocol (CMP) or simple certificate enrollment protocol (SCEP)) to provision the mobile device 102 with a subscription certificate for authentication with the service provider. In some embodiments, the certificate enrollment process may be configured to take less than sixty seconds under typical conditions. Typical conditions may include when the Wi-Fi hotspot 102 and the core network of the service provider core are not congested and the certificate enrollment server 110 is not overloaded. At the end of a successful procedure, the mobile device 102 will have been provisioned a subscription certificate that is used for authentication with the Wi-Fi network of that service provider. When unsuccessful, the mobile device 102 will be notified of certificate enrollment failure.

The subscription certificate received in operation 316 may be an X.509 type certificate suitable for use for EAP-TLS based authentication with a network. In some embodiments, the subscription certificate may be an X.509v3 certificate and may be configured in accordance with an ITU-T standard for a public key infrastructure (PKI) for single sign-on (SSO) and Privilege Management Infrastructure (PMI).

In operation 318, the mobile device 102 may initiate and re-negotiate a TLS connection to the subscription server 106 in accordance with the procedures of RFC 2560. If certificate enrollment was successful, the mobile device 102 may be configured to use the provisioned certificate when performing TLS authentication. If certificate enrollment failed (e.g., the mobile device 102 did not receive a certificate), the mobile device 102 may perform server-side only authentication when performing TLS authentication. If TLS authentication fails, the mobile device 102 may be configured to abort the credential provisioning process.

In operation 320, the mobile device may transmit an ospPostDevData message in accordance with a SOAP technique to the subscription server 106. The message may the device detail and device info MOs. The mobile device 102 may set the request reason value in this message to "Certificate enrollment completed" if certificate enrollment succeeded or "Certificate enrollment failed" if certificate enrollment failed.

In operation 322, when certificate enrollment succeeded, the subscription server 106 transmits an ospPostDevDataResponse message in accordance with the SOAP technique to the mobile device 102. This message may include an add MO (addMO) command and the subscription MO. The subscription MO may include certificate identifiers binding the provisioned certificate to the subscription as well as ancillary provisioning data. In the ospPostDevDataResponse message, a status (i.e., ospStatus) value may be set to "provisioning complete" to indicate that the subscription and certificate provisioning process has been completed.

In operation 324, the mobile device 102 may release the TLS session established in operation 304. In operation 326, the mobile device 102 may disassociate from the Wi-Fi network.

In operation 328, if the subscription was established successfully in operation 316, the mobile device 102 may associate again with the Wi-Fi hotspot 104 (i.e., with the same service-set identifier (SSID) or the same HESSID) using the newly-obtained credentials (i.e., the credentials provisioned in operation 322).

Figure 4:
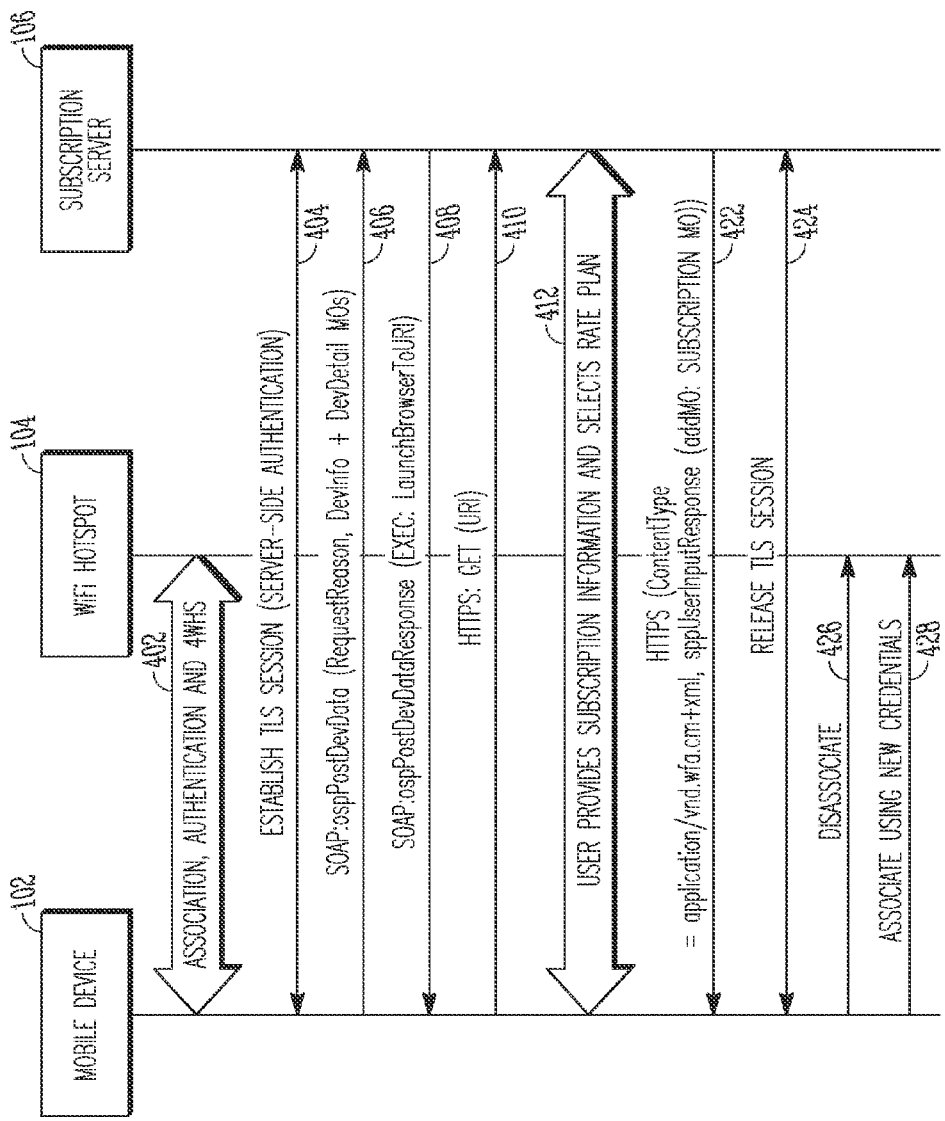
FIG. 4 illustrates messages exchanged for secure on-line sign-up and provisioning of username/password type credentials using SOAP-XML techniques in accordance with some embodiments.

FIG. 4 illustrates messages exchanged for secure on-line sign-up and provisioning of username/password type credentials using SOAP-XML in accordance with some embodiments.

Operations 402, 404, 406 and 408 are similar to operations 302, 304, 306 and 308, except that in operation 408, the subscription server 106 may use the information provided in the DevInfo and DevDetail MOs to determine that user/password credentials are to be provisioned.

Operations 410 and 412 are similar to operations 310 and 312.

In operation 422, the mobile device 102 may retrieve from the subscription server 106 an ospUserInputResponse XML instance document and the subscription server 106 may transmit an ospPostDevDataResponse message in accordance with the SOAP technique to the mobile device 102. This message may include an add MO (addMO) command and the subscription MO.

In operation 424, the mobile device 102 may release the TLS session established in operation 404. In operation 426, the mobile device 102 may disassociate from the Wi-Fi network.

In operation 428, if the subscription was established successfully in Step-7, the mobile device 102 may associate again with the Wi-Fi Hotspot 104 (i.e., with the same service-set identifier (SSID) or the same HESSID) using the newly-obtained credentials (i.e., the credentials provisioned in operation 422).

Figure 5:
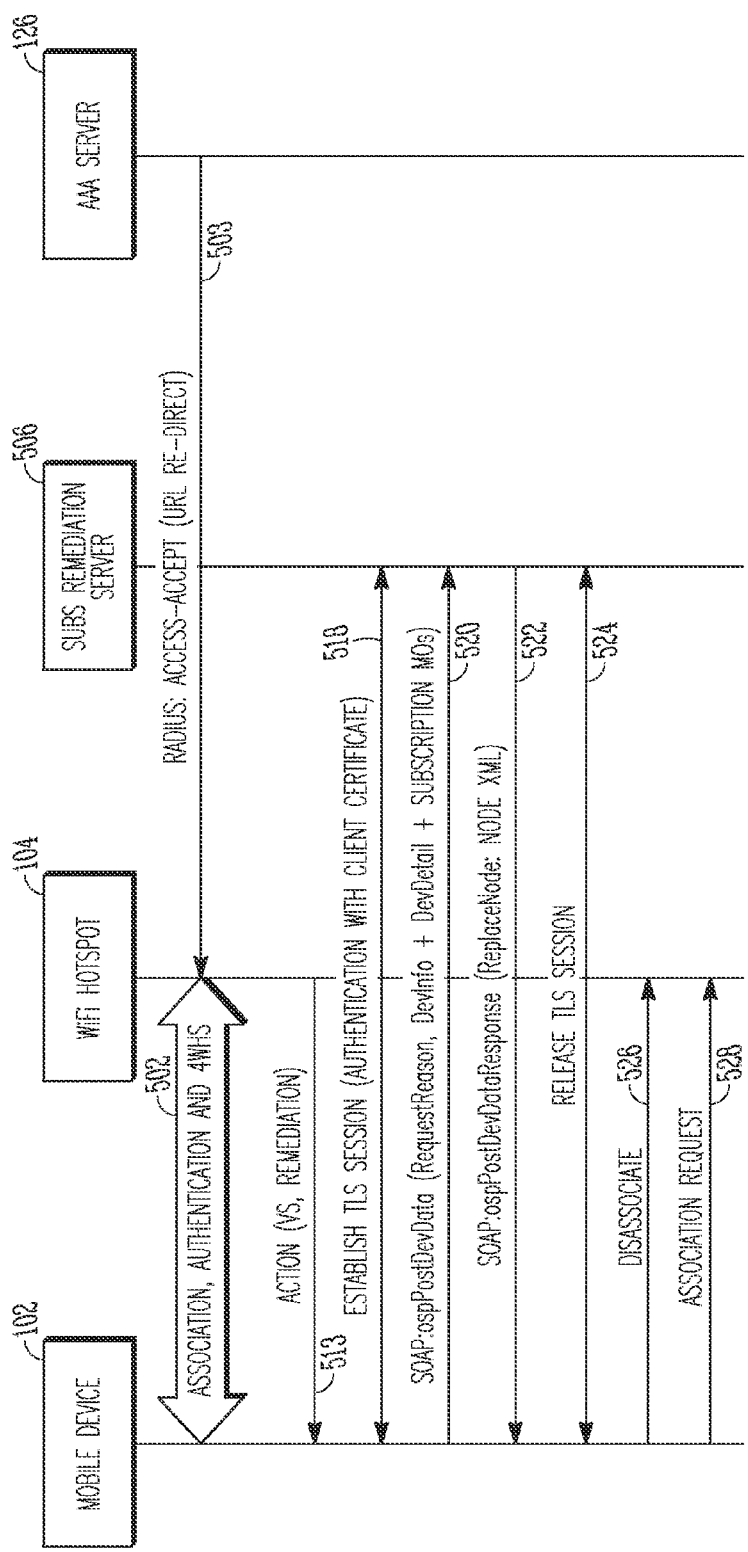
FIG. 5 illustrates messages exchanged for subscription remediation using SOAP-XML techniques in accordance with some embodiments.

FIG. 5 illustrates messages exchanged for subscription remediation using SOAP-XML in accordance with some embodiments. From time-to-time, the user's subscription or account may be in need of remediation. The service provider may determine when this is necessary, but examples include password expiration and delinquent payment of the account. The need for subscription remediation may be stored in a subscriber's subscription database entry in the service provider's AAA Server, such as AAA server 126. Subsequent to an authentication request from that subscriber on a Wi-Fi network, the need for remediation may be signaled to the mobile device 102. The mobile device 102 may then engage in a subscription remediation message exchange with the subscription remediation server as discussed below.

In operation 502, the mobile device 102 associates with the Wi-Fi hotspot 104 and performs authentication process that includes an EAP method, similar to that of operation 202 (FIG. 2). When the service provider determines that subscription remediation is needed, in operation 503 the AAA server 126 is configured to send a RADIUS ACCESS-ACCEPT message with a URL re-direct to the authenticator at the end of the EAP authentication sequence. The RADIUS ACCESS-ACCEPT message may include access restrictions to limit access to the mobile device 102 for purposes of subscription mediation. The URL re-direct may indicate the URL of the subscription remediation server 506.

In operation 513, the authenticator shall cause the Wi-Fi hotspot 104 (with which the mobile device has authenticated) to transmit to the mobile device 102 an action frame that indicates the need for subscription remediation. The action frame may be a vendor specific (VS) action frame. In other embodiments, the mobile device 102 may use techniques (i.e., other than receipt of the action frame) to determine that limited connectivity exists (e.g., due to access restrictions) and to determine that subscription remediation is needed.

In operation 518, the mobile device 102 may establish a TLS connection with the subscription remediation server 506 similar to operation 304 (FIG. 4). The mobile device 102 may be configured to verify that the certificate of the subscription remediation server 506 has not been revoked. In some embodiments, the mobile device 102 may use an Online Certificate Status Protocol (OCSP) technique within the TLS connection to determine the status of the certificate. If the certificate has been revoked, the mobile device 102 may abort the subscription remediation process. If the mobile device 102 is unable to initiate a TLS connection to the subscription remediation server 506, it may also be configured to abort the subscription remediation process. The mobile device 102 may be configured to prevent attempts to perform subscription remediation using HTTP (i.e., without the security of HTTPS).

In operation 520, the mobile device 102 may be configured to transmit an ospPostDevData message in accordance with a SOAP technique to the subscription remediation server 506, similar to that of operation 306. The message may be configured to include Open Mobile Alliance Device-Management (OMA-DM) protocol DevInfo, DevDetail and Subscription MOs, and the value for requestReason may be set to "Subscription remediation". The subscription remediation server 506 may request HTTP authentication using the digest method and the mobile device 102 may provide a username and password digest to the server. If HTTP authentication is not successful, subscription remediation may not be possible and the mobile device 102 may be configured to abort the process and may inform the user accordingly.

In operation 522, the subscription remediation server 506 may transmit the ospPostDevDataResponse message in accordance with a SOAP technique to the mobile device 102. The message may include XML data for one or more interior nodes of the subscription MO (described in more detail below). The mobile device 102 may be configured to replace one or more interior nodes of the subscription MO with updated credentials received in the message. The ospStatus in the ospPostDevDataResponse message may be set to "Remediation complete" to indicate the subscription remediation process has been completed.

In operation 524, the mobile device 102 may release the TLS that was established in operation 518 and may dissociate with the Wi-Fi network in operation 526. In operation 528, the mobile device 102 may then associate using the credentials that were updated during the subscription remediation process.

Embodiments disclosed herein are applicable to machine remediation as well as user remediation. Machine remediation refers to problem(s) with the subscription can be remediated without any user intervention. User remediation refers to problem(s) with the subscription that may require user intervention to remediate.

Figure 6:
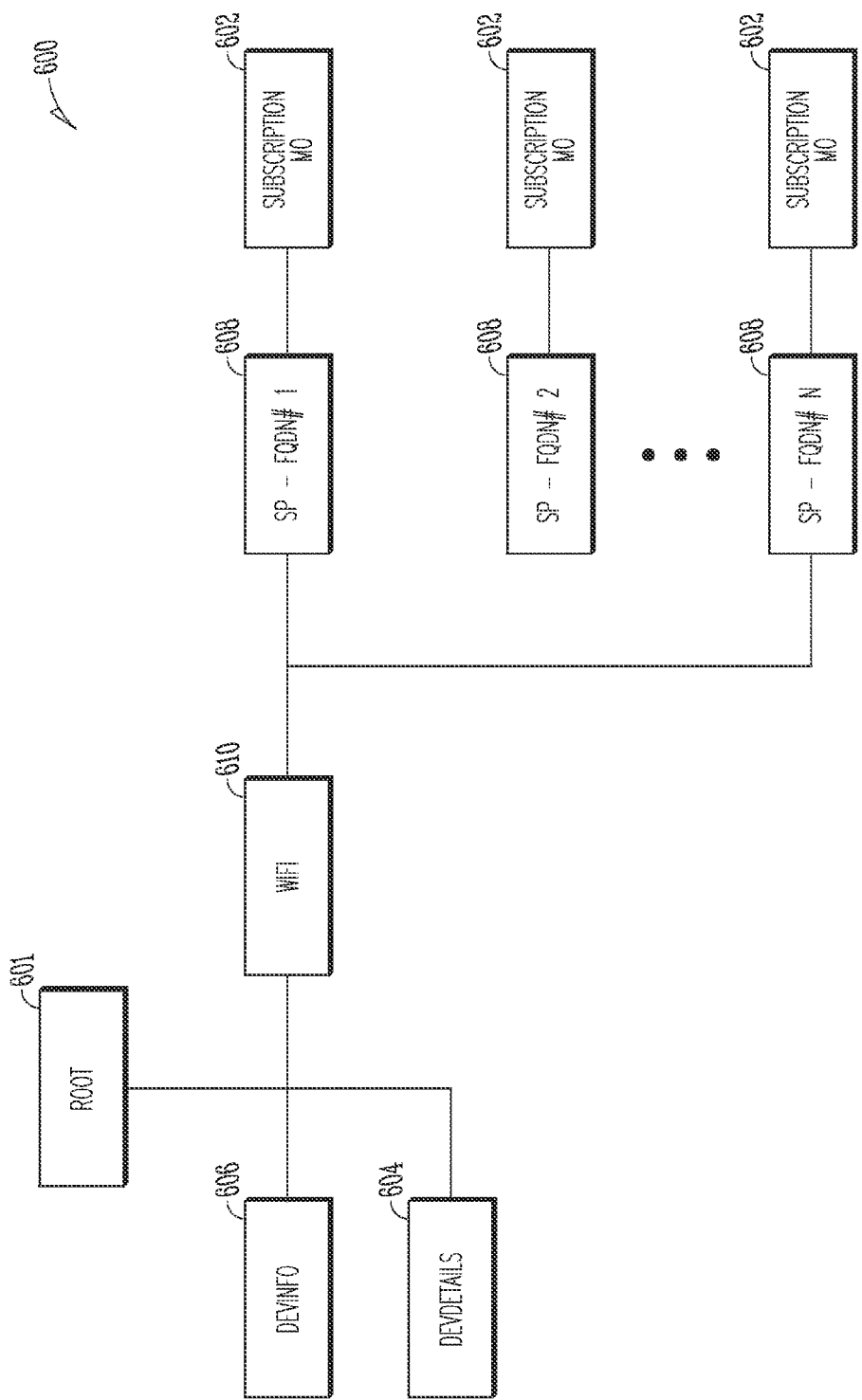
FIG. 6 illustrates a management object tree in accordance with some embodiments.

FIG. 6 illustrates a management object tree in accordance with some embodiments. The management object tree 600 may be stored in mobile device 102 and may include tree root 601, a subscription MO 602 for each service provider (SP) as well as the FQDN 608 for each service provider. The management object tree 600 may also include a device information MO 606 (DevInfo) and a device detail MO 604 (DevDetails). The management object tree 600 may also include Wi-Fi MO 610 for device specific Wi-Fi objects.

In some embodiments, the device detail MO 604 may include device information such as model, vendor info, type of adaptor, adaptor configuration, etc. and user information. The device detail MO 604 may include additional information such as URI from where additional info specific to device may be obtained, device type (e.g., PC Card, USB, modem, express card, gaming device, music player, navigation device), OEM name, firmware version, software version, hardware version and whether the host device supports large object handling. The device info MO 606 may include a unique identifier (e.g., the GUID) for host device, a manufacturer identifier, device model, SOAP client version identifier, and the language setting of the host device.

Figure 7:
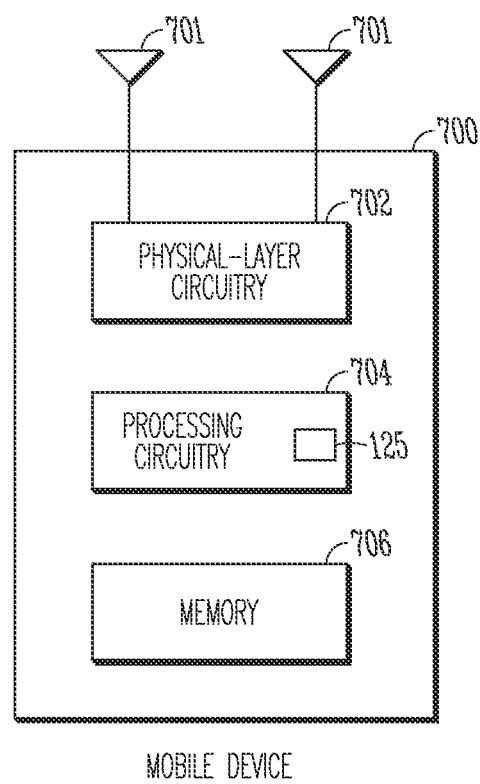
FIG. 7 illustrates a mobile device in accordance with some embodiments.

FIG. 7 illustrates a mobile device in accordance with some embodiments. Mobile device 700 may be suitable for use as mobile device 102 and may be configured to perform the various operations discussed above for secure on-line sign-up and provisioning of credentials, as well as subscription remediation.

Mobile device 700 may include physical-layer circuitry 702 configured for wireless communications with Wi-Fi hot spots, such as Wi-Fi hotspot 104 (FIG. 1) using one or more of antennas 701. Mobile device 700 may also include processing circuitry 704, which may be configured for performing the operations described herein along with memory 706 for storing, among other things, the provisioned credentials and a subscription MO 602 (FIG. 6) as well as the other elements of the management object tree 600 (FIG. 6). The processing circuitry 704 may include SOAP processing element 125 for performing the various SOAP techniques described herein. Mobile device 700 may also include other functional elements, such as media-access control (MAC) layer circuitry for media access control for performing other operations.

In the case of a single-mode mobile device, the physical layer circuitry 702 may be configured for communicating with Wi-Fi networks. In dual-mode embodiments, the physical layer circuitry 702 may be configured for communicating with both cellular networks and Wi-Fi networks. In dual-mode embodiments, the mobile device 700 may include both a Wi-Fi transceiver and one or more cellular network transceivers. In dual-mode embodiments, the mobile device 700 may also be configured to offload traffic from the cellular network to the available Wi-Fi networks.

In some embodiments, mobile device 700 may be a portable wireless communication device, such as a personal digital assistant (PDA), a laptop or portable computer with wireless communication capability, a web tablet, a wireless telephone, a smart-phone, a wireless headset, a pager, an instant messaging device, a digital camera, an access point, a television, a medical or health device, an entertainment device, or other device that may receive and/or transmit information wirelessly.

Antennas 701 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas 701 may be effectively separated to take advantage of spatial diversity and the different channel characteristics that may result between each of antennas 701 and the antennas of a transmitting station.

Although the mobile device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of mobile device 700 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors and may be configured with instructions stored on a computer-readable storage device to implement the various operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by a mobile device for secure on-line sign-up and provisioning for Wi-Fi Hotspot 2.0 networks, the method comprising:
   authenticating with a Wi-Fi access network (AN) through a Wi-Fi Hotspot using Extensible Authentication Protocol (EAP);
   performing an initial Simple Object Access Protocol (SOAP) exchange with a subscription server to authenticate the subscription server and to provide an indication of a request reason; and
   performing a final SOAP exchange with the subscription server over the Wi-Fi network, wherein, when the subscription server acts as an online sign-up server (OSU), the method includes:
   exchanging information with the OSU to establish a subscription with a service provider for Wi-Fi network access and to receive a subscription management object (MO) including provisioned credentials for the subscription;
   disassociating with the Wi-Fi Hotspot after the final SOAP exchange; and re-associating with the Wi-Fi Hotspot to re-establish a Wi-Fi connection, the re-associating using an EAP technique and including:
provide the provisioned credentials to an AAA server over the re-established Wi-Fi connection.

2. The method of claim 1 wherein the initial SOAP exchange further includes:
providing device capability information of the mobile device, and wherein the request reason comprises credential provisioning and subscription remediation.

3. The method of claim 1 wherein the initial SOAP exchange and the final SOAP exchange comprise messages configured in accordance with a SOAP technique using secure Hypertext Transfer Protocol (HTTPS) as an application layer protocol for transport, and
wherein the messages are configured in accordance with an extensible-markup language (XML) message format.

4. The method of claim 3 wherein the initial SOAP exchange comprises:
transmitting, by the mobile device, an online signup protocol (osp) post-device data (ospPostDevData) message in accordance with the SOAP technique to the subscription server, the message including device information (DevInfo) and device detail (DevDetail); and
receiving an ospPostDevDataResponse message in accordance with the SOAP technique from the subscription server, the response message including a Execute: LaunchBrowsertoURl command, wherein the mobile device is configured to launch a browser, establish a secure HTTPS connection to an online server URI received in the response message and send an HTTPS GET request to the online server URI.

5. The method of claim 1 further comprising:
receiving, as part of the initial SOAP exchange with the subscription server, an indication of a type of credentials to be provisioned,
wherein the type of credentials to be provisioned includes one of certificate-based credentials, username/password credentials, or subscriber-information module (SIM) type credentials.

6. The method of claim 1, wherein when subscription mediation is needed, the method includes receiving an action message indicating a need for subscription remediation after associating with the Wi-Fi Hotspot, and
wherein during the initial SOAP exchange, the method further includes requesting subscription remediation with a subscription mediation server and exchanging information in accordance with a SOAP technique.

7. A device including one or more processors, the one or more processors including circuitry, the circuitry having logic to:
authenticate with a Wi-Fi access network (AN) through a Wi-Fi Hotspot using Extensible Authentication Protocol (EAP);
perform an initial Simple Object Access Protocol (SOAP) exchange with a subscription server to authenticate the subscription server, and to provide an indication of a request reason; and
perform a final SOAP exchange with the subscription server over the Wi-Fi network, wherein, when the subscription server acts as an online sign-up server (OSU), the logic is further to:
exchange information with the OSU to establish a subscription with a service provider for Wi-Fi network access and to receive a subscription management object (MO) including provisioned credentials for the subscription.

8. The device of claim 7 wherein as part of the initial SOAP exchange, the logic is further to:
provide device capability information of the device,
wherein the request reason comprises one of credential provisioning and subscription remediation.

9. The device of claim 7 wherein the initial SOAP exchange and the final SOAP exchange comprise messages configured in accordance with a SOAP technique using secure Hypertext Transfer Protocol (HTTPS) as an application layer protocol for transport, and
wherein the messages are configured in accordance with an extensible-markup language (XML) message format.

10. The device of claim 7, wherein the logic is further to:
provide a web page user prompt to receive user input;
exchange the user input in a user exchange with the subscription server; and
receive a notification from the subscription server as to whether the user exchange is complete.

11. The device of claim 8, wherein when the reason for the request is provisioning of credentials, the logic is to receive, from the subscription server, an indication of a type of credentials to be provisioned by the server.

12. The device of claim 8, wherein when the reason for the request is to request subscription mediation, the initial SOAP exchange is to include the device receiving an indication of an authentication from the subscription server.

13. The device of claim 7, wherein the device further includes:
memory; and
one or more transceivers.

14. The device of claim 13, wherein the device further includes:
one or more antennas.

15. A method performed by a subscription server to provide secure on-line sign-up and provisioning for Wi-Fi Hotspot 2.0 networks for a mobile device, the method comprising:
sending an accept message to a Wi-Fi hotspot from an AAA server to allow a mobile device access to the Wi-Fi network and establish a Wi-Fi connection with the mobile device;
performing an initial Simple Object Access Protocol (SOAP) exchange with the mobile device to provision credentials or perform subscription remediation, the initial SOAP exchange including the mobile device authenticating the subscription server;
performing a final SOAP exchange with the mobile device over the Wi-Fi network to allow the mobile device to receive a subscription management object (MO); and
exchanging information with the mobile device to establish a subscription with a service provider for Wi-Fi network access, to provision credentials for the subscription, and to create the subscription MO for the provisioned credentials.

16. The method of claim 15 wherein the accept message is a RADIUS ACCESS-ACCEPT message that includes access restrictions to be enforced by the Wi-Fi Hotspot, the access restrictions to limit access of the mobile device to the Wi-Fi network for either provisioning of credentials or subscription remediation, and
wherein the accept message is sent in response to the mobile device associating with the Wi-Fi Hotspot using an Extensible Authentication Protocol (EAP) technique.

17. The method of claim 16 wherein as part of the initial SOAP exchange with the subscription server, the method includes:

determining a type of credentials to be provisioned and indicating the type of credentials to be provisioned to the mobile device, wherein the type of credentials to be provisioned includes one of certificate-based credentials, username/password credentials, or subscriber-information module (SIM) type credentials.

18. A non-transitory machine-readable medium that stores instructions for execution by one or more processors to configure a device to:

associate with a Wi-Fi network through a Wi-Fi Hotspot using an Extensible Authentication Protocol (EAP) technique;

perform an initial Simple Object Access Protocol (SOAP) exchange with a subscription server to authenticate the subscription server, and to provide an indication of a request reason; and perform a final SOAP exchange with the subscription server over the Wi-Fi network, wherein, when the subscription server acts as an online sign-up server (OSU), the instructions further configure the device to:

exchange information with the OSU to establish a subscription with a service provider for Wi-Fi network access, and to receive a subscription management object (MO) including provisioned credentials for the subscription;

disassociate with the Wi-Fi Hotspot after the final SOAP exchange; and re-associate with the Wi-Fi Hotspot to re-establish a Wi-Fi connection, the re-associating using an EAP technique and including:

providing the provisioned credentials to an AAA server over the re-established Wi-Fi connection.

19. The non-transitory machine-readable medium of claim 18 wherein the instructions further configure the device to:

provide device capability information of the device, wherein the request reason comprises one of provisioning of credentials or remediation of a subscription.

20. The non-transitory machine-readable medium of claim 18, wherein the initial and final SOAP exchanges comprise messages configured in accordance with a SOAP technique using secure Hypertext Transfer Protocol (HTTPS) as an application layer protocol for transport, and the messages are configured in accordance with an extensible-markup language (XML) message format.

* * * * *